(12) United States Patent
Nam et al.

(10) Patent No.: US 11,872,781 B2
(45) Date of Patent: Jan. 16, 2024

(54) SCARF PATCH REPAIR METHOD FOR STEALTH COMPOSITE STRUCTURE

(71) Applicants: INDUSTRY-ACADEMIC COOPERATION FOUNDATION GYEONGSANG NATIONAL UNIVERSITY, Jinju-si (KR); INDUSTRY-ACADEMIC COOPERATION FOUNDATION, YONSEI UNIVERSITY, Seoul (KR)

(72) Inventors: Young Woo Nam, Jinju-si (KR); Gi Won Jeong, Jinju-si (KR); Jin Hwe Kweon, Jinju-si (KR); Jin Ho Choi, Jinju-si (KR); Joon hyung Shin, Busan (KR); Bo Seong Kwon, Jinju-si (KR); Jong Gwan Yook, Seoul (KR); Yeong Hoon Noh, Changwon-si (KR)

(73) Assignees: INDUSTRY-ACADEMIC COOPERATION FOUNDATION GYEONGSANG NATIONAL UNIVERSITY, Jinju-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/926,035

(22) PCT Filed: Nov. 2, 2020

(86) PCT No.: PCT/KR2020/015158
§ 371 (c)(1),
(2) Date: Nov. 17, 2022

(87) PCT Pub. No.: WO2021/235622
PCT Pub. Date: Nov. 25, 2021

(65) Prior Publication Data
US 2023/0182421 A1 Jun. 15, 2023

(30) Foreign Application Priority Data

May 18, 2020 (KR) .......................... 10-2020-0059374

(51) Int. Cl.
*B29C 73/10* (2006.01)
*B64F 5/40* (2017.01)
(Continued)

(52) U.S. Cl.
CPC ................ *B29C 73/10* (2013.01); *B64F 5/40* (2017.01); *B64D 7/00* (2013.01); *F41H 3/00* (2013.01); *H01Q 17/00* (2013.01)

(58) Field of Classification Search
CPC ......... B29C 73/06; B29C 73/10; B29C 65/00; B29C 65/48; B29C 65/483;
(Continued)

(56) References Cited

U.S. PATENT DOCUMENTS 5,645,886 A * 7/1997 Schueler, II ........ B05C 17/0052
427/140
9,365,282 B2 6/2016 Shigetomi et al.
(Continued)

FOREIGN PATENT DOCUMENTS

| JP | 2014100847 A | 6/2014 |
|---|---|---|
| KR | 102015014583 | 9/2015 |
| KR | 101901094 B1 | 9/2018 |

OTHER PUBLICATIONS

International Search Report issued in corresponding PCT Application No. PCT/KR2020/015158, dated Jun. 29, 2021, 4 pages.
(Continued)

*Primary Examiner* — Philip C Tucker
*Assistant Examiner* — Brian R Slawski
(74) *Attorney, Agent, or Firm* — DILWORTH IP, LLC

(57) ABSTRACT

A method for repairing a damaged area of a stealth composite structure having a stealth function using a scarf patch
(Continued)

includes the steps of diagnosing the damaged area; deriving a repair area including the diagnosed damaged area; processing the scarf patch according to the derived repair area; machining a patch hole according to the derived repair area to remove the damaged area; and coupling the scarf patch to the patch hole so that an inner wall of the patch hole and a side surface of the scarf patch face.

8 Claims, 7 Drawing Sheets

(51) Int. Cl.
    *B64D 7/00*         (2006.01)
    *F41H 3/00*         (2006.01)
    *H01Q 17/00*      (2006.01)

(58) Field of Classification Search
    CPC ............ B29C 65/4835; B29C 66/0224; B29C 66/301; B29C 66/721; B29C 66/723; B29C 66/7232; B29C 66/72321; B29C 66/7314; B29C 66/73941; B64F 5/40; B64D 7/00; F41H 3/00; H01Q 17/00

USPC ............ 156/60, 64, 94, 98, 182, 293, 303.1, 156/307.1, 307.3, 307.4, 307.7; 244/2, 244/117 R, 119, 121, 129.1, 133
See application file for complete search history.

(56) References Cited

U.S. PATENT DOCUMENTS

| | | |
|---|---|---|
| 2013/0192381 A1 | 8/2013 | Becker et al. |
| 2015/0185128 A1* | 7/2015 | Chang ..................... B29C 73/10 |
| | | 702/35 |
| 2018/0311933 A1* | 11/2018 | Hasan ...................... B64C 1/12 |

OTHER PUBLICATIONS

Notice to Submit a Response issued in corresponding Korean Application No. 10-2020-0059374, dated Aug. 21, 2021, 8 pages.
Notice of Allowance issued in corresponding Korean Application No. 10-2020-0059374, dated Dec. 1, 2021, 7 pages.

* cited by examiner

SCARF PATCH REPAIR METHOD FOR STEALTH COMPOSITE STRUCTURE

FIELD OF THE INVENTION

The present invention relates to a method of repairing a stealth composite structure by using a scarf patch, and more particularly, to a method of repairing a damaged portion of a stealth composite structure by using a scarf patch.

BACKGROUND OF THE INVENTION

A stealth technology means a technology which reduces or controls various signals of our weapon system so that the various signals are not easily captured by a counterpart's radar, infrared tracker, sonar, etc. The application of a shape design, an electromagnetic wave absorption material, or an electromagnetic wave absorption structure is basically representative of such a stealth technology.

The shape design is a method of designing an aircraft so that an electromagnetic wave from the aircraft is reflected in a different direction by artificially forming an angle in the aircraft. However, in the case of the shape design, aircraft performance is degraded because an aerodynamic characteristic of the aircraft is degraded. The electromagnetic wave absorption material is a method of implementing electromagnetic wave absorption performance by applying a magnetic paint to a surface of an aircraft. However, the electromagnetic wave absorption material has disadvantages of low mechanical properties and high maintenance and repair costs and has a disadvantage in that it is vulnerable to an environment.

Recently, in order to supplement the disadvantages of the electromagnetic wave absorption material, research on an electromagnetic wave absorption structure has been actively carried out. The electromagnetic wave absorption structure performs a structural role in addition to electromagnetic wave absorption.

Such an electromagnetic wave absorption structure is chiefly implemented by using a composite material. However, in general, the composite material structure does not have reinforced fiber that connects layers in a thickness direction thereof from the nature of the composite material structure manufactured by stacking thin prepregs, and each layer is supported by only adhesive strength of a polymer matrix. Accordingly, the composite material structure is vulnerable to a phenomenon, such as delamination attributable to an impact load, such as a tool drop, a collision with a step car, lightning, or hail. Accordingly, a technology for preventing and repairing the delamination phenomenon of the composite material structure has been in the spotlight of many researchers.

The existing method of repairing a composite structure by using a scarf patch has a problem in that stealth performance of a composite structure is not recovered after repair because the method is focused on recovering mechanical properties of the structure.

SUMMARY OF THE INVENTION

The present invention is to provide a method of repairing a stealth composite structure by using a scarf patch, which can repair a damaged portion of a composite structure having a stealth function due to an electromagnetic wave absorption layer by using a scarf patch and also recover mechanical performance and electromagnetic wave absorption performance of the composite structure.

A method of repairing a stealth composite structure by using a scarf patch according to an embodiment of the present invention is a method of repairing a stealth composite structure by using a scarf patch, the method repairing a damaged portion of the stealth composite structure having a stealth function through a scarf patch and including steps of diagnosing the damaged portion, deriving a repair area including the diagnosed damaged portion, processing the scarf patch based on the derived repair area, processing a patch hole based on the derived repair area so that the damaged portion is removed, and combining the scarf patch with the patch hole so that an inner wall of the patch hole and a side of the scarf patch face each other.

Furthermore, the step of deriving the repair area based on the diagnosed damaged portion includes a step of deriving a width and depth of the repair area, which has a width obtained by adding a given margin to a maximum length of the diagnosed damaged portion and includes the entire diagnosed damaged portion.

Furthermore, in the step of processing the scarf patch based on the derived repair area, the scarf patch includes a first surface, a second surface toward a direction opposite to a direction that the first surface faces, and a body having at least one electromagnetic wave absorption layer stacked between the first surface and the second surface, and the first surface corresponds to the derived repair area, and the second surface is processed to have a structure having a length that has been extended 20 times the depth of the derived repair area from an edge of the first surface.

Furthermore, the thickness of the scarf patch from the first surface to the second surface corresponds to the depth of the derived repair area, and the body is processed to have a stack structure identical with a stack structure of the composite structure.

Furthermore, in the step of processing the patch hole based on the derived repair area, the patch hole is processed to correspond to a shape of the scarf patch.

Furthermore, the patch hole is processed so that a minimum value of a width of a transverse cross section of the patch hole becomes the width of the derived repair area and a maximum value of the width of the transverse cross section of the patch hole becomes a length obtained by adding 40 times the depth of the derived repair area to the width of the derived repair area.

Furthermore, the height of the patch hole corresponds to the depth of the derived repair area, and the patch hole is a cone that extends in a straight line from one end having a diameter having the minimum value to the other end having a diameter having the maximum value.

Furthermore, the step of combining the scarf patch with the patch hole includes a step of forming an adhesive layer on the inner wall of the patch hole or the side of the scarf patch so that the inner wall of the patch hole and the side of the scarf patch face each other.

Furthermore, the step of combining the scarf patch with the patch hole further includes a step of performing thermosetting on the stealth composite structure to which the scarf patch has adhered.

The method of repairing a stealth composite structure by using a scarf patch according to an embodiment of the present invention can recover electromagnetic wave absorption performance in addition to mechanical performance of the structure after repair, by removing a damaged portion from the structure and designing a structure of a scarf patch that is combined with a removed area.

The effects of the present invention are not limited to the above-mentioned effects, and other effects which are not

BRIEF DESCRIPTION OF THE DRAWINGS

FIG. 2b is a longitudinal cross-sectional view of a cutting-plane line II' in FIG. 2a.

DETAILED DESCRIPTION OF THE INVENTION

Figure 1:
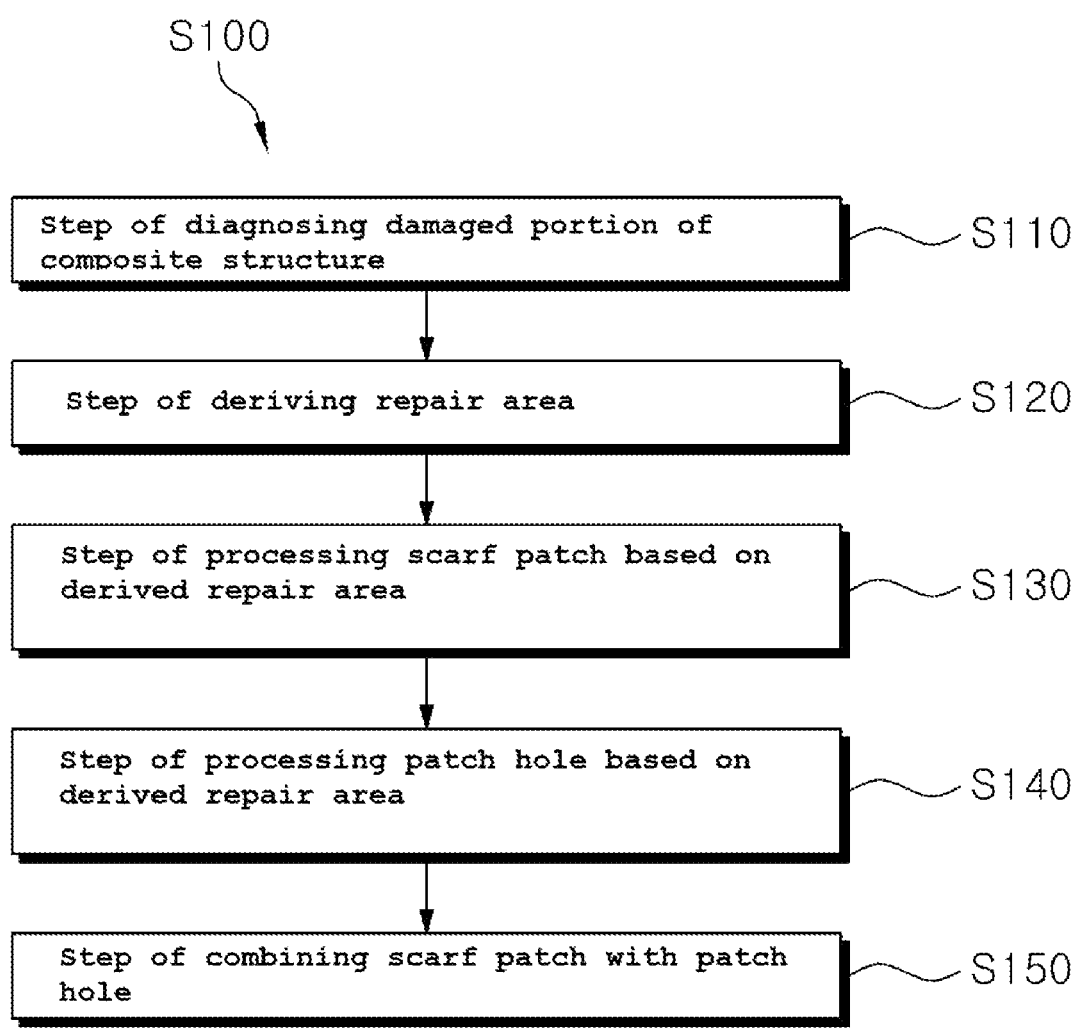
FIG. 1 is a flowchart of a method of repairing a stealth composite structure by using a scarf patch according to an embodiment of the present invention.

Hereinafter, a method of repairing a stealth composite structure by using a scarf patch according to various embodiments of the present invention is described with reference to the accompanying drawings.

Various embodiments of this document and terms used in the embodiments are not intended to limit the technical characteristics, described in this document, to specific embodiments, and should be understood as including various changes, equivalents or alternatives of a corresponding embodiment. In relation to the description of the drawings, similar reference numerals may be used for similar or related elements. A singular form of a noun corresponding to an item may include one item or a plurality of items unless explicitly described otherwise in the context. In this document, each of phrases, such as "A or B", "at least one of A and B", "at least one of A or B", "A, B or C", "at least one of A, B and C", and "at least one of A, B, or C", may include any one of items listed along with a corresponding one of the phrases or all possible combinations of the listed items. Terms, such as "a first", "a second", or "the first" or "the second", may be used to merely distinguish between a corresponding element and another corresponding element, and do not limit corresponding elements in another aspect (e.g., importance or a sequence).

FIG. 1 is a flowchart of a method of repairing a stealth composite structure by using a scarf patch according to an embodiment of the present invention.

Referring to FIG. 1, the method S100 of repairing a stealth composite structure by using a scarf patch according to an embodiment of the present invention is a method of removing a damaged portion of a composite structure that is included in an electromagnetic wave absorption layer and that has a stealth function if the composite structure is locally damaged by the falling of a thunderbolt, etc. and repairing the damaged portion by using a scarf patch, and includes step S110 of diagnosing a damaged portion, step S120 of deriving a repair area including the diagnosed damaged portion, step S130 of processing a scarf patch based on the repair area, step S140 of processing a patch hole based on the repair area so that the damaged portion is removed, and step S150 of combining the scarf patch with the patch hole.

Figure 2A:
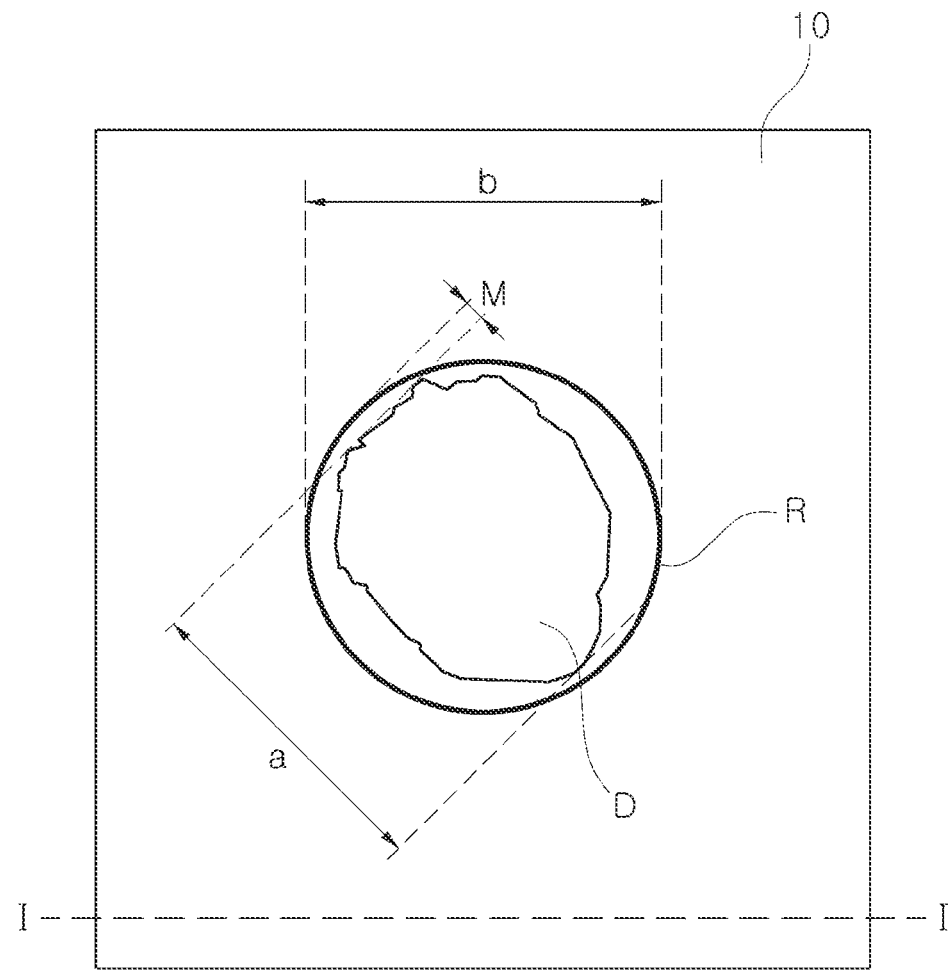
FIG. 2a is a top view illustrating a damaged portion of a stealth composite structure according to an embodiment of the present invention.
Figure 2B:
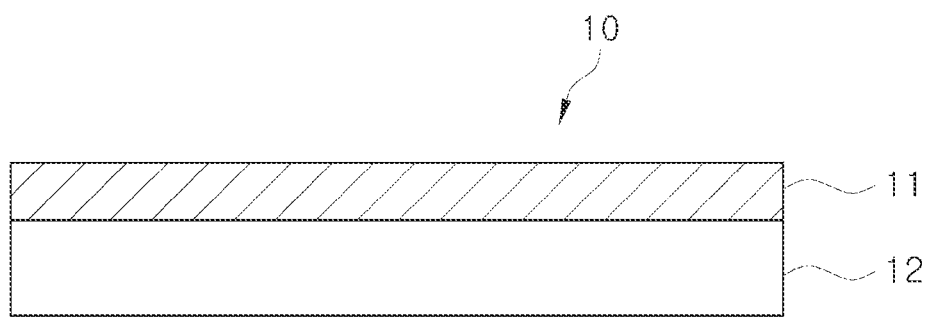

FIG. 2a is a top view illustrating a damaged portion of a stealth composite structure according to an embodiment of the present invention. FIG. 2b is a longitudinal cross-sectional view of a cutting-plane line II' in FIG. 2a.

Referring to FIGS. 2a and 2b, a stealth composite structure 10 to which the method S100 of repairing a stealth composite structure by using a scarf patch according to an embodiment of the present invention is applied includes an electromagnetic wave absorption layer 11 and a dielectric layer 12, and corresponds to a radar absorbing structure (RAS) that is applied to the outside of moving means, such as an aircraft and that avoids detection using an electromagnetic wave of an X-band (8.2 to 12.4 GHz).

In the present embodiment, the stealth composite structure 10 includes the electromagnetic wave absorption layer 11 on which a first sheet that is formed as glass fiber coated with nickel through an electroless plating method is impregnated into epoxy resin has been stacked, and the dielectric layer 12 on which a second sheet that is formed as glass fiber is impregnated into epoxy resin has been stacked. In this case, the thickness of each of the electromagnetic wave absorption layer 11 and the dielectric layer 12 and the stacking sequence of the electromagnetic wave absorption layer 11 and the dielectric layer 12 are calculated through complex permittivity and a transmission line equation of each layer so that the stealth composite structure 10 has optimum stealth performance.

In the case of the illustrated embodiment, the stealth composite structure 10 has a structure in which the electromagnetic wave absorption layer 11 has been stacked on the dielectric layer 12. The first sheet is stacked in three layers, and the thickness of the electromagnetic wave absorption layer 11 including the three layers is 0.351 mm. The second sheet is stacked in twenty-one layers, and the thickness of the dielectric layer including the twenty-one layers is 2.730 mm. It was checked that the stealth composite structure 10 had electromagnetic wave absorption performance of −10 dB or less in an 8.57 to 12.4 GHz band.

The electromagnetic wave absorption structure (RAS), that is, the stealth composite structure, is damaged by the falling of a thunderbolt, etc. during the operation of moving means to which the stealth composite structure has been applied. Such damage includes, for example, the breakage of fiber that forms a composite and pyrolysis damage of resin. Mechanical properties of the damaged stealth composite structure, such as a tensile force, deteriorate, and the damaged stealth composite structure also does not exhibit electromagnetic wave absorption performance. Accordingly, the damaged stealth composite structure needs to be repaired for the recovery of the performance.

Referring to FIGS. 1 and 2a, in the method S100 of repairing a stealth composite structure by using a scarf patch according to an embodiment of the present invention, if a damaged portion D is present in the composite structure 10, first, step S110 of diagnosing the damaged portion D is performed.

In step S110, the area and depth of the damaged portion D are diagnosed. For example, the area of the damaged portion D is diagnosed through a C-scan, and non-destructive inspection using diagnosis through 3D X-ray CT is performed on the depth of the damaged portion D. A location and maximum length a and depth of the damaged portion D may be seen through the diagnosis in step S110.

In step S120, a repair area including the damaged portion is derived based on the information on the damaged portion diagnosed in step S110. The method S100 of repairing a stealth composite structure by using a scarf patch according to an embodiment of the present invention is to remove a damaged portion of a composite structure having degraded mechanical properties and stealth performance and to replace the removed portion with a scarf patch. It is necessary to set an area that needs to be repaired for the recovery of performance of a composite structure.

In step S120, a repair area R has a width obtained by adding a given margin M to the maximum length a of the diagnosed damaged portion D so that the entire diagnosed damaged portion D is included. The depth of the repair area R is derived to become the thickness of the stealth composite structure 10 for the complete removal of the damaged portion. In the embodiment illustrated in FIG. 2a, the repair area R is derived as a circle that includes the entire area of the damaged portion D diagnosed through the C-scan and that has a diameter b obtained by adding the given margin M to both ends of the maximum length a of the diagnosed damaged portion.

Figure 3:
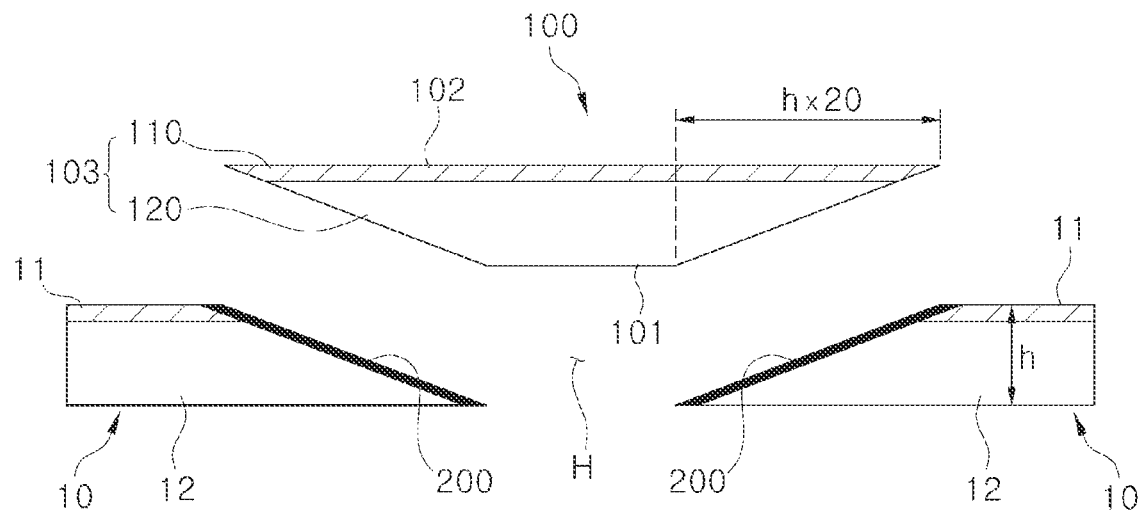
FIG. 3 is a diagram describing one step of the method of repairing a stealth composite structure by using a scarf patch according to an embodiment of the present invention.

FIG. 3 is a diagram describing one step of the method of repairing a stealth composite structure by using a scarf patch according to an embodiment of the present invention.

Referring to FIG. 3, the method S100 of repairing a stealth composite structure by using a scarf patch according to an embodiment of the present invention includes removing a damaged portion of the stealth composite structure 10 and recovering the stealth composite structure 10 that has been partially damaged by processing and combining a scarf patch corresponding to a removed area.

In step S130, a scarf patch 100 that will substitute the damaged portion D and a periphery thereof is designed and processed based on the repair area R that has been derived in step S120.

In step S130, the scarf patch 100 includes a first surface 101, a second surface 102 toward a direction opposite to a direction that the first surface 101 faces, and a body 103 having the same stack structure as the stack structure of the stealth composite structure 10 to be repaired between the first surface and the second surface. The body 103 has at least one electromagnetic wave absorption layer.

The first surface 101 of the scarf patch 100 corresponds to the repair area R that has been derived in step S120, and the second surface 102 thereof has a structure having a length that has been extended 20 times the depth of the repair area R that has been derived in step S120 from an edge of the first surface 101. The scarf patch 100 has a scarf ratio of 1/20. The cross section of the scarf patch 100 has a symmetrical trapezoidal shape in which the first surface 101 and the second surface 102 are lower and upper sides, respectively.

The thickness of the scarf patch 100 is a distance from the first surface to the second surface, and corresponds to the depth of the repair area R that has been derived in step S120. The thickness of the scarf patch 100 is designed as the thickness of the stealth composite structure 10.

In the embodiment illustrated in FIG. 3, the body 103 of the scarf patch 100 is processed to have the same stack structure as the stealth composite structure 10. That is, the body 103 has a structure in which an electromagnetic wave absorption layer 110 has been stacked on a dielectric layer 120. For example, a first sheet is stacked in three layers, and the thickness of the electromagnetic wave absorption layer 11 including the three layers is 0.351 mm. A second sheet is stacked in twenty-one layers, and the thickness of the dielectric layer including the twenty-one layers is 2.730 mm.

In the present embodiment, the bottom, that is, the first surface 101 of the scarf patch 100, is processed in the form of a circle having the diameter b corresponding to the repair area R. The top, that is, the second surface 102 of the scarf patch 100, is the circle having a length that has been extended 20 times the depth of the repair area R that has been derived in step S120, that is, the thickness h of the stealth composite structure 10, from the edge of the first surface 101 of the circle. The scarf patch 100 according to an example is generally a cone having the scarf ratio of 1/20, and may be variously changed in shape.

In step S140, a patch hole H, that is, a space in which the scarf patch 100 that has been processed in step S130 may be combined with the damaged stealth composite structure 10 is designed and processed based on the repair area that has been derived in step 120 so that the damaged portion D is removed from the stealth composite structure 10.

The patch hole H is processed to correspond to a shape of the scarf patch 100. That is, a longitudinal cross-sectional shape of the patch hole H is a symmetrical trapezoidal shape in which a minimum width and maximum width of a transverse cross section thereof are lower and upper sides, respectively. In this case, a minimum value of the width of the transverse cross section of the patch hole H is the width of the repair area R that has been derived in step 120. A maximum value of the width of the transverse cross section of the patch hole H is a length obtained by adding 40 times the depth of the repair area R that has been derived in step 120, that is, the thickness h of the stealth composite structure 10, to the width of the repair area R.

In the embodiment illustrated in FIG. 3, the bottom of the patch hole H, which has a minimum width, is a circle having the diameter b corresponding to the repair area R. The top of the patch hole H, which has a maximum width, is the circle having a length that has been extended 20 times the depth of the repair area R that has been derived in step S120, that is, the thickness h of the stealth composite structure 10, from the edge of the bottom of the circle. The patch hole H is a conical hole that extends in a diagonal line from the bottom having the minimum width to the top having the maximum width, and is processed by using computer numerical control (CNC) equipment.

In step S150, the scarf patch 100 is combined with the patch hole H from which the damaged portion D of the stealth composite structure 10 has been removed so that a side of the scarf patch 100 that has been processed in step S130 faces an inner wall of the patch hole H that has been processed in step S140.

Step S150 includes step S151 of forming an adhesive layer 200 on the inner wall of the patch hole H or the side of the scarf patch 100 so that the inner wall of the patch hole H and the side of the scarf patch 100 face each other, and step S153 of performing thermosetting on the adhesive layer 200.

In step S151, the scarf patch 100 is combined with the stealth composite structure 10 through the adhesive layer 200 that has been formed on the inner wall of the patch hole H. An area in which the scarf patch 100 adheres to the stealth composite structure 10, that is, the area of the adhesive layer 200, is determined by the scarf ratio of the scarf patch. In an embodiment of the present invention, the scarf patch may be formed to have a scarf ratio of 1/20 in order to increase the recovery rate of mechanical properties of the stealth composite structure 10 that has been repaired by using the scarf patch.

In step S153, the stealth composite structure 10 to which the scarf patch 100 has adhered is subjected to thermosetting. Through the thermosetting step, a combining force of the scarf patch 100, the adhesive layer 200, and the stealth composite structure 10 is increased.

Figure 4:
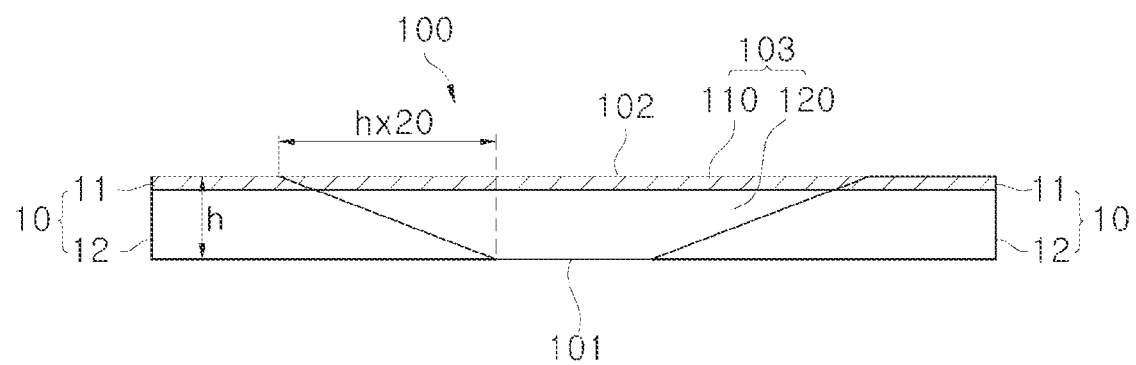
FIG. 4 is a cross-sectional view of a composite structure that has been repaired by the method of repairing a stealth composite structure by using a scarf patch according to an embodiment of the present invention.

FIG. 4 is a cross-sectional view of a composite structure that has been repaired by the method of repairing a stealth composite structure by using a scarf patch according to an embodiment of the present invention.

Referring to FIG. 4, in the method S100 of repairing a stealth composite structure by using a scarf patch according to an embodiment of the present invention, the patch hole H from which the damaged portion of the stealth composite structure 10 has been removed is processed. The scarf patch corresponding to the patch hole is combined with the patch hole, thus recovering the stealth composite structure 10 that has been partially damaged without the deterioration of mechanical properties and electromagnetic wave absorption performance of the stealth composite structure 10. The stealth composite structure 10 that has been repaired by the method S100 of repairing a stealth composite structure by using a scarf patch according to an embodiment of the present invention has a shape in which the removed patch hole H and the scarf patch 100 correspond to each other, and has no additional weight increase because the scarf patch has the same composite stack structure as the structure 10. Furthermore, moving means using the stealth composite structure 10 repaired by the method S100 of repairing a stealth composite structure by using a scarf patch according to an embodiment of the present invention after the repair has no change in aerodynamic characteristics attributable to a repair because an external appearance of the stealth composite structure 10 is not different from that before the repair.

Figure 5:
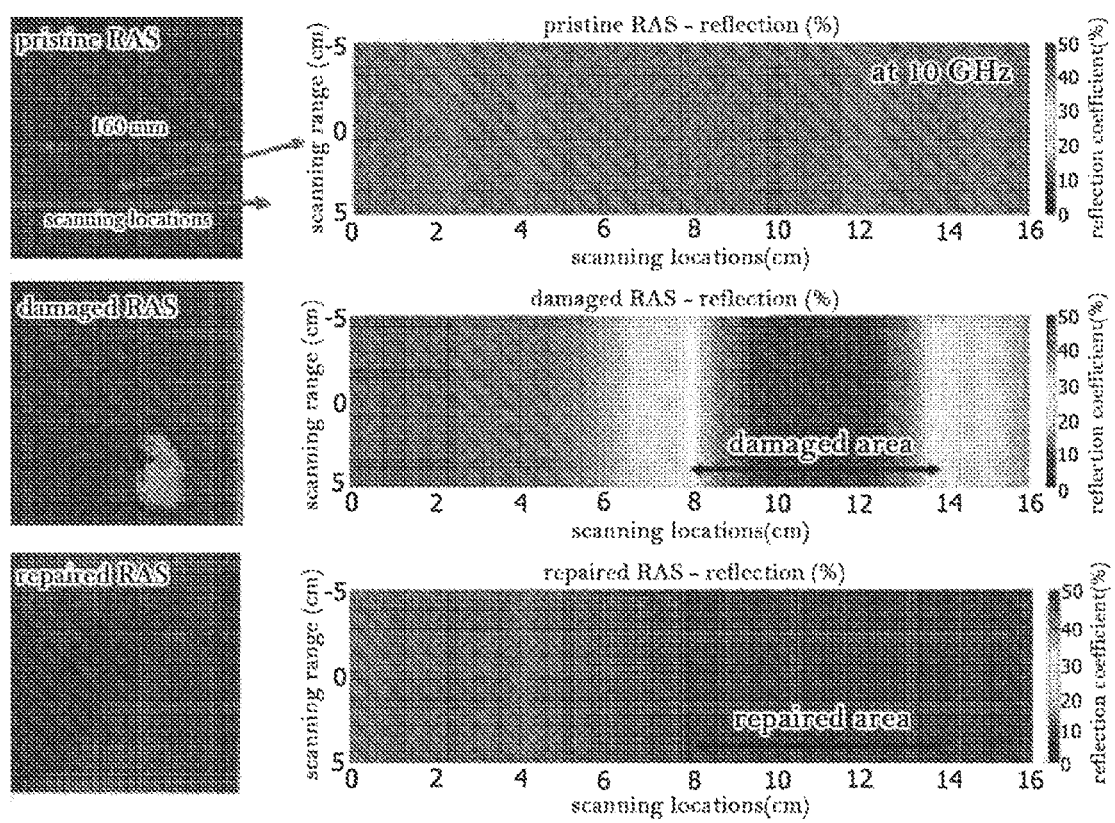
FIGS. 5 to 7 are diagrams illustrating electromagnetic wave absorption performance of a stealth composite structure that was repaired by the method of repairing a stealth composite structure by using a scarf patch according to an embodiment of the present invention.
Figure 6:
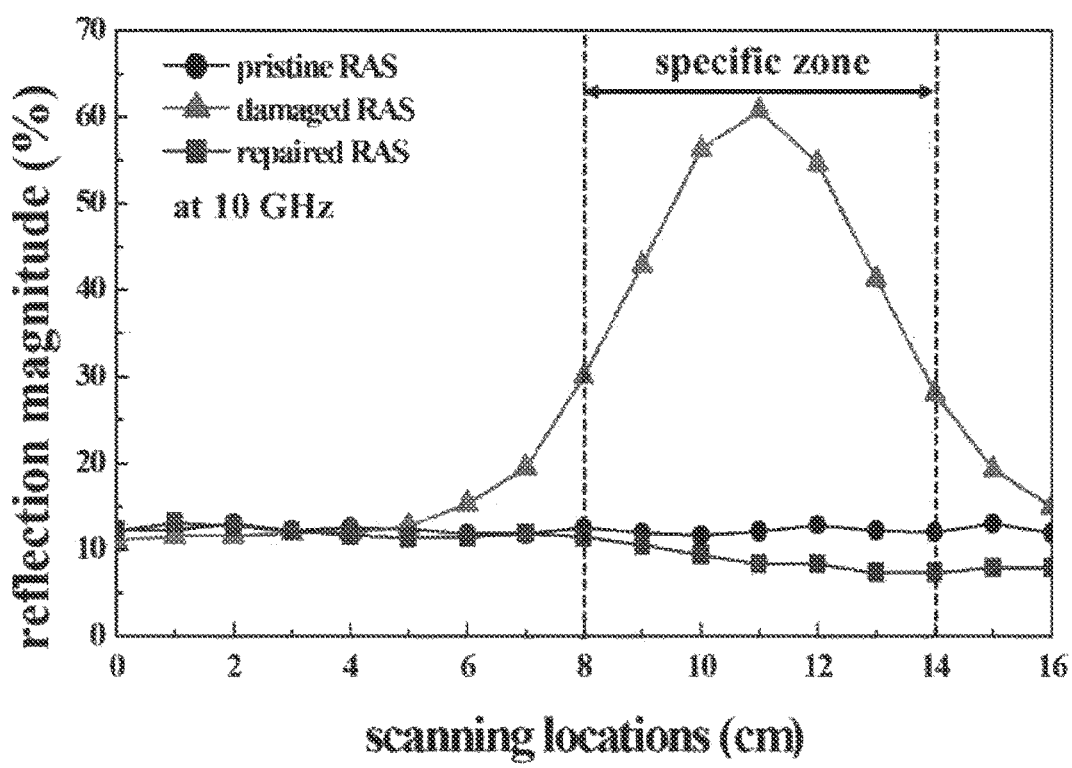
Figure 7:
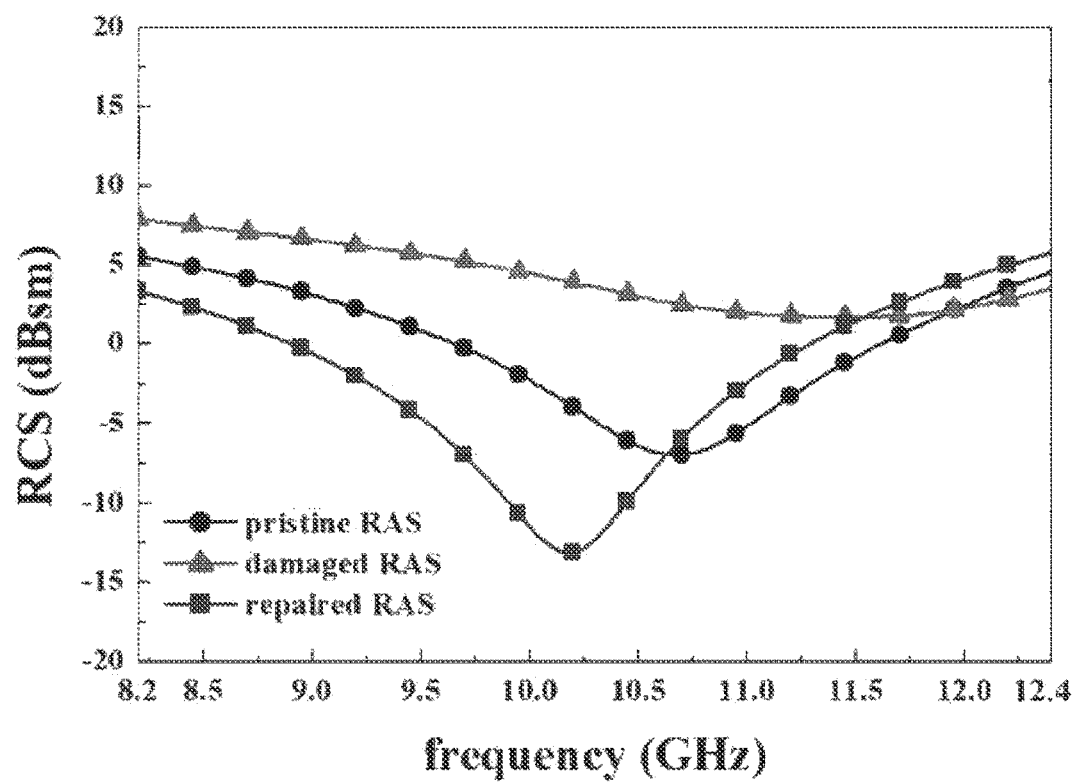

FIGS. 5 to 7 are diagrams illustrating electromagnetic wave absorption performance of a stealth composite structure that was repaired by the method of repairing a stealth composite structure by using a scarf patch according to an embodiment of the present invention.

Referring to FIGS. 5 and 6, in order to check the recovery of electromagnetic wave absorption performance of the composite structure 10 that was repaired by the method S100 of repairing a stealth composite structure by using a scarf patch according to an embodiment of the present invention, reflectance of a non-damaged stealth composite structure (pristine RAS), a locally damaged stealth composite structure (damaged RAS), and the stealth composite structure (repaired RAS) that was repaired by the method S100 of repairing a stealth composite structure by using a scarf patch for an electromagnetic wave of a 10 GHz frequency was measured. As the results of the measurement, as in FIGS. 5 and 6, it may be seen that the level of electromagnetic wave absorption performance of the stealth composite structure (repaired RAS) repaired by the method S100 of repairing, by using a scarf patch, the stealth composite structure having electromagnetic wave absorption performance deteriorated due to the damage was recovered to the same level before the damage.

FIG. 7 is the results of measurement of radar-cross sections (RCSs) of the non-damaged stealth composite structure (pristine RAS), the locally damaged stealth composite structure (damaged RAS), and the stealth composite structure (repaired RAS) repaired by the method S100 of repairing a stealth composite structure by using a scarf patch for an X-band (8.2 to 12.4 GHz) electromagnetic wave. In this case, the radar-cross section (RCS) means a quantitative numerical value of power density of back scattering for a radar receiver when an electromagnetic wave is incident on an object.

As in the graph of FIG. 7, it may be seen that the level of RCS numerical values of the stealth composite structure (repaired RAS) repaired by the method S100 of repairing, by using a scarf patch, a stealth composite structure having RCS numerical values deteriorated due to the damage with respect to the X-band electromagnetic was recovered to the same level before the damage.

Figure 8A:
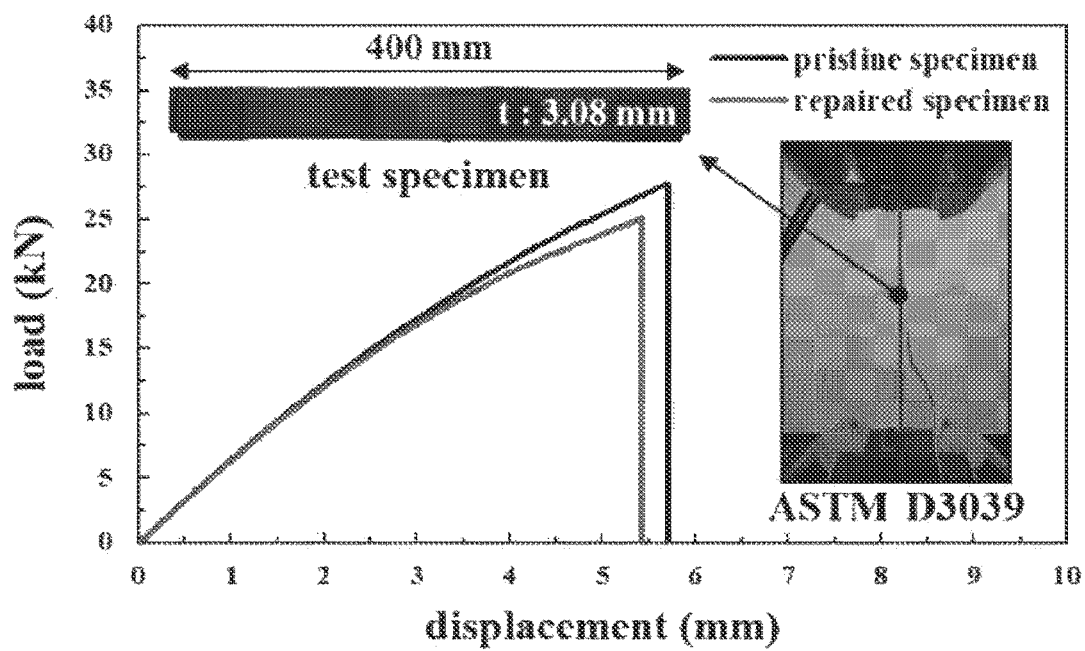
FIGS. 8a and 8b are diagrams illustrating mechanical properties of a stealth composite structure that was repaired by the method of repairing a stealth composite structure by using a scarf patch according to an embodiment of the present invention.
Figure 8B:
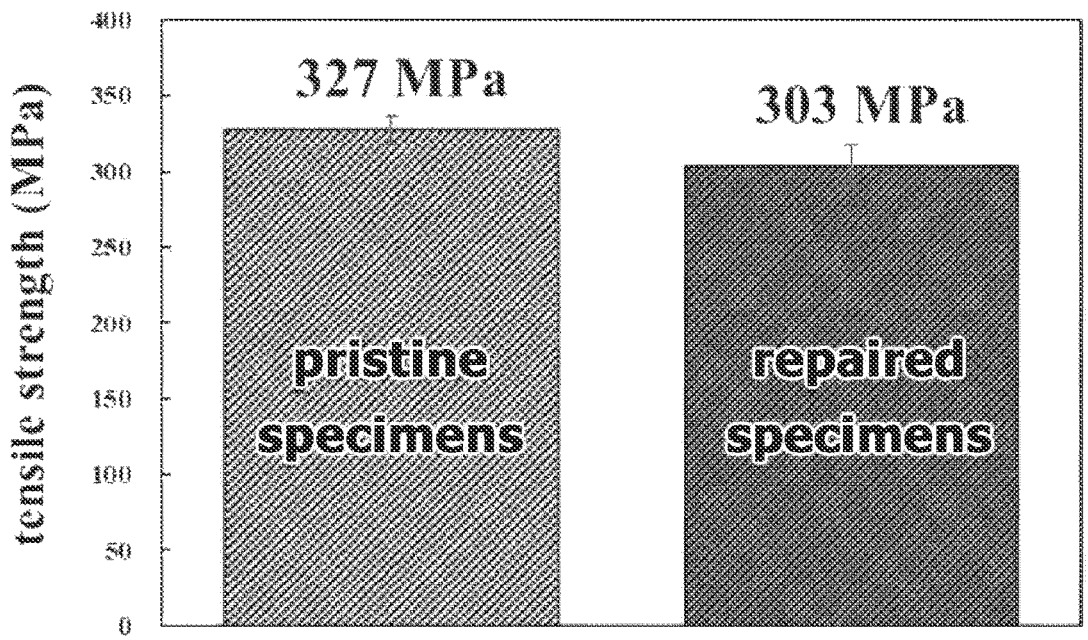

FIGS. 8a and 8b are diagrams illustrating mechanical properties of a stealth composite structure that was repaired by the method of repairing a stealth composite structure by using a scarf patch according to an embodiment of the present invention.

FIGS. 8a and 8b are the results of tensile tests that were performed on specimens having non-damaged stealth composite structures (pristine specimens) and specimens having composite structures (repaired specimens) repaired by the method S100 of repairing a stealth composite structure by using a scarf patch, and illustrate a load-displacement curve and tensile strength, respectively. In this case, a maximum load is defined as a breakage load of the specimen.

Referring to FIGS. 8a and 8b, the specimen having the non-damaged stealth composite structure (pristine specimen) has a breakage load of 27.35 kN and average maximum strength of 327 MPa. The specimen having the composite structure (repaired specimen) repaired by the method S100 of repairing a stealth composite structure by using a scarf patch has a breakage load of 23.91 kN and average maximum strength of 303 MPa. Accordingly, the stealth composite structure repaired by the method S100 of repairing a stealth composite structure by using a scarf patch according to an embodiment of the present invention shows a recovery rate of 93% in mechanical properties.

What is claimed is:
1. A method of repairing a stealth composite structure by using a scarf patch, wherein a damaged portion of the stealth composite structure having a stealth function is repaired through the scarf patch, the method comprising steps of:
   diagnosing the damaged portion;
   deriving a repair area comprising the diagnosed damaged portion;
   processing the scarf patch based on the derived repair area that includes a first surface, a second surface toward a direction opposite to a direction that the first surface faces, and a body having a same stack structure as a stack structure of the stealth composite structure between the first surface and the second surface, and the first surface corresponds to the derived repair area and the second surface is processed to have a structure having a length that has been extended 20 times a depth of the derived repair area from an edge of the first surface;
   processing a patch hole based on the derived repair area so that the damaged portion is removed; and
   combining the scarf patch with the patch hole so that an inner wall of the patch hole and a side of the scarf patch face each other,
   wherein the stealth composite structure includes an electromagnetic wave absorption layer on which a first sheet that is formed as glass fiber coated with nickel impregnated into epoxy resin has been stacked, and a dielectric layer on which a second sheet that is formed as glass fiber impregnated into epoxy resin has been stacked.

2. The method of claim 1, wherein the step of deriving the repair area based on the diagnosed damaged portion comprises a step of deriving a width and the depth of the repair area, wherein the width is obtained by adding a given margin to a maximum length of the diagnosed damaged portion and comprises the entire diagnosed damaged portion.

3. The method of claim 2, wherein in the step of processing the patch hole based on the derived repair area, the patch hole is processed to correspond to a shape of the scarf patch.

4. The method of claim 3, wherein the patch hole is processed so that a minimum value of a width of a transverse cross section of the patch hole becomes the width of the derived repair area and a maximum value of the width of the transverse cross section of the patch hole becomes a length obtained by adding 40 times the depth of the derived repair area to the width of the derived repair area.

5. The method of claim 4, wherein:
a height of the patch hole corresponds to the depth of the derived repair area, and
the patch hole is a cone that extends in a straight line from one end having a diameter having the minimum value to the other end having a diameter having the maximum value.

6. The method of claim 1, wherein:
a thickness of the scarf patch from the first surface to the second surface corresponds to the depth of the derived repair area.

7. The method of claim 1, wherein the step of combining the scarf patch with the patch hole comprises a step of forming an adhesive layer on the inner wall of the patch hole or the side of the scarf patch so that the inner wall of the patch hole and the side of the scarf patch face each other.

8. The method of claim 7, wherein the step of combining the scarf patch with the patch hole further comprises a step of performing thermosetting on the stealth composite structure to which the scarf patch has adhered.

* * * * *